US008282986B2

(12) United States Patent
Speer et al.

(10) Patent No.: US 8,282,986 B2
(45) Date of Patent: Oct. 9, 2012

(54) METHOD OF APPLYING PHOSPHOR COATINGS

(75) Inventors: Richard S. Speer, Concord, MA (US); Madis Raukas, Charlestown, MA (US)

(73) Assignee: OSRAM SYLVANIA, Inc., Danvers, MA (US)

( * ) Notice: Subject to any disclaimer, the term of this patent is extended or adjusted under 35 U.S.C. 154(b) by 1116 days.

(21) Appl. No.: 11/750,023

(22) Filed: May 17, 2007

(65) Prior Publication Data

US 2007/0292609 A1 Dec. 20, 2007

Related U.S. Application Data

(60) Provisional application No. 60/747,615, filed on May 18, 2006.

(51) Int. Cl.
*B05D 5/06* (2006.01)
*B05D 3/02* (2006.01)
(52) U.S. Cl. .................. 427/71; 427/67; 427/385.5
(58) Field of Classification Search .............. 427/64, 427/67, 71, 385.5
See application file for complete search history.

(56) References Cited

U.S. PATENT DOCUMENTS

| 3,798,479 | A | * | 3/1974 | Chiola et al. | 313/486 |
| 3,877,962 | A | * | 4/1975 | Taylor et al. | 427/375 |
| 4,480,213 | A | | 10/1984 | Lapatovich et al. | |
| 4,492,898 | A | | 1/1985 | Lapatovich et al. | |
| 4,810,938 | A | | 3/1989 | Johnson et al. | |
| 5,523,018 | A | * | 6/1996 | Okada et al. | 252/301.4 P |
| 6,048,469 | A | * | 4/2000 | Xiang et al. | 252/301.6 R |
| 6,657,379 | B2 | | 12/2003 | Ellens et al. | |
| 6,695,982 | B2 | | 2/2004 | Ellens et al. | |
| 6,972,521 | B2 | | 12/2005 | Scholl et al. | |
| 7,002,291 | B2 | | 2/2006 | Ellens et al. | |
| 7,064,480 | B2 | | 6/2006 | Bokor et al. | |
| 2005/0023963 | A1 | * | 2/2005 | Menkara et al. | 313/503 |
| 2005/0122034 | A1 | * | 6/2005 | Yamashita | 313/503 |
| 2005/0127811 | A1 | * | 6/2005 | Choi et al. | 313/486 |
| 2005/0242329 | A1 | | 11/2005 | Fiedler et al. | |
| 2006/0103297 | A1 | | 5/2006 | Fiedler et al. | |
| 2007/0122687 | A1 | * | 5/2007 | Sakurai et al. | 429/42 |
| 2007/0247829 | A1 | | 10/2007 | Fiedler et al. | |

FOREIGN PATENT DOCUMENTS

| EP | 0 494 310 A1 | 7/1992 |
| EP | 0 507 533 A2 | 10/1992 |
| EP | 1 238 041 B1 | 9/2002 |

(Continued)

OTHER PUBLICATIONS

U.S. Appl. No. 11/749,893, filed May 17, 2007.

*Primary Examiner* — James Lin
(74) *Attorney, Agent, or Firm* — Robert F. Clark; Andrew Martin

(57) ABSTRACT

A method of applying a phosphor coating is described. The method comprises forming a suspension of a phosphor and a polymer binder dissolved in a solvent, the phosphor comprising at least one of a nitridosilicate or an oxonitridosilicate phosphor, the polymer binder being capable of decomposing thermally; applying the suspension to a substrate to form a coating; drying the coating; and baking the coating in an inert atmosphere to thermally decompose the polymer binder to form the phosphor coating, preferably at a temperature less than about 400° C. in a nitrogen atmosphere. A preferred polymer binder is polyisobutyl methacrylate

9 Claims, 5 Drawing Sheets

FOREIGN PATENT DOCUMENTS

| | | |
|---|---|---|
| EP | 1 449 264 B1 | 8/2006 |
| WO | WO 92/03104 | 3/1992 |
| WO | WO 02/103748 | 12/2002 |
| WO | WO 2005-045115 * | 5/2005 |
| WO | WO 2005/045881 | 5/2005 |
| WO | WO 2006/012833 A2 | 5/2007 |

* cited by examiner

METHOD OF APPLYING PHOSPHOR COATINGS

CROSS REFERENCES TO RELATED APPLICATIONS

This application claims the benefit of U.S. Provisional Application No. 60/747,615, filed May 18, 2006.

BACKGROUND OF THE INVENTION

The use of mercury in common mass-produced products is declining because of environmental concerns and increased governmental regulation. This trend keenly affects the lighting industry since mercury has been a primary material in the manufacture of lamps for decades, particularly fluorescent lamps.

In view of this, recent efforts have been made to reduce or eliminate mercury in fluorescent lamps. For example, PCT Patent Application No. WO 02/103748 describes a low-pressure gas discharge lamp based on an indium-containing gas filling. In particular, the lamp contains an indium halide, e.g., indium chloride, and an inert gas. The radiation emitted by the discharge has emission bands around 304, 325, 410 and 451 nm, as well as a continuous molecular spectrum in the visible blue range. A number of phosphors are listed for supplementing the radiation from the discharge in order to obtain white light. PCT Patent Application No. WO 2005/0456881, which is incorporated herein by reference, extends the list of available phosphors to use with the indium halide discharge to nitridosilicate and oxonitridosilicate phosphors.

In order to apply a phosphor coating to the inner surface of a glass tube to produce a fluorescent lamp, the phosphor powders are mixed into slurries containing a polymer and various other liquids. These liquids can be organic solvents and/or water, depending on which polymer is being used. After the coating is applied to the glass and dried, the coating is generally baked at >500° C. in an air atmosphere in order to decompose the polymer and leave behind only the phosphor layer. However, nitridosilicate and oxonitridosilicate phosphors tend to degrade significantly as a result of the baking process which makes them generally unsuited for use in a conventional fluorescent lamp manufacturing process.

SUMMARY OF THE INVENTION

The method of this invention uses a polymer which decomposes thermally via depolymerization instead of an oxidation reaction. Thus, the binder may be removed by baking in an inert atmosphere, preferably nitrogen. Moreover, the baking temperature may be lower than 500° C. depending upon the polymer. In particular, it is preferred to use polyisobutyl-methacrylate (PIBMA) as the polymer binder and to decompose the binder by baking in nitrogen at less than about 400° C., and more preferably less than about 350° C., and even more preferably between about 300° C. and about 350° C.

In general, the nitridosilicate and oxonitridosilicate phosphors which may benefit from this method have the general formula, $(M^I, M^{II}, M^{III})_x Si_a O_z N_{b-z}$ ($M^I$=Mg, Ca, Sr, Ba, Zn; $M^{II}$=La, Gd, Y, Sc, Lu; $M^{III}$=B, Al, Ga, C, Ge) and are activated by Eu, Ce, or Yb.

More particularly, the phosphors may have the formulas:

$(Sr_{1-x-y-z}Ba_xCa_y)Si_2N_2O_2:Eu_z$, where $0<x<0.2$, $0<y<0.2$ and $0<z<0.1$;

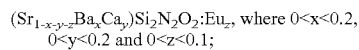
$Ca_{1-x-y}Sr_xSi_2N_2O_2:Eu_y$, where $0<x<0.5$ and $0<y<0.1$;

$(Sr_{1-x-y-z}Ca_xBa_y)_2Si_5N_8:Eu_z$, where $0<x<1$, $0<y<1$ and $0<z<0.1$;

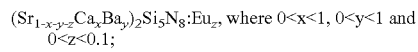
$(Sr_{1-x-y-z}Ba_xCa_y)_2Si_{5-a}Al_aN_{8-a}O_a:Eu_z$, where $0<x<1$, $0<y<1$, $0<z<0.1$ and $0<a<4$;

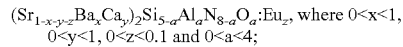
and $(Sr_{1-x-y-z}Ba_xCa_y)Si_2N_2O_2:Yb_z$, where $0<x<0.2$, $0<y<0.2$ and $0<z<b$ 0.1.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Making use of new phosphor types that have been developed for long-wavelength ultraviolet (UV) and blue/violet excitation assists in generating "white" light from radiation produced in indium halide and other similar Hg-free discharges. These phosphor types include nitridosilicate and oxonitridosilicate phosphors such as red-emitting phosphors $(Sr,Ca)_2Si_5N_8:Eu^{2+}$ and $Ca_2Si_5N_8:Eu^{2+}$, yellow-orange-emitting phosphors $Ca_{1.5}Al_3Si_9N_{16}:Eu^{2+}$ and $CaAl_2Si_{10}N_{16}:Eu^{2+}$, and green-emitting phosphor $SrSi_2O_2N_2:Eu^{2+}$. Despite the high quantum efficiencies of these compounds for excitation at the long-UV and blue/violet wavelengths, the phosphors suffer from sensitivity to oxygen-containing environments during preparation as well as application to devices.

The nitridosilicate and oxonitridosilicate phosphors are reactive at elevated temperatures in the presence of oxygen and if exposed to this environment they will degrade in varying degrees, up to a point of being useless. This may be partly due to the chemical composition of the lattice material and partly due to the relative instability of $Eu^{2+}$ activators in these lattices at elevated temperatures ($Eu^{3+}$ is typically a more stable configuration). This behavior makes these phosphors unsuited for use in a standard fluorescent lamp manufacturing process wherein the phosphor coating is baked onto the glass envelope in air at a temperature sufficient to decompose the organic binder, typically >500° C.

Figure 1:
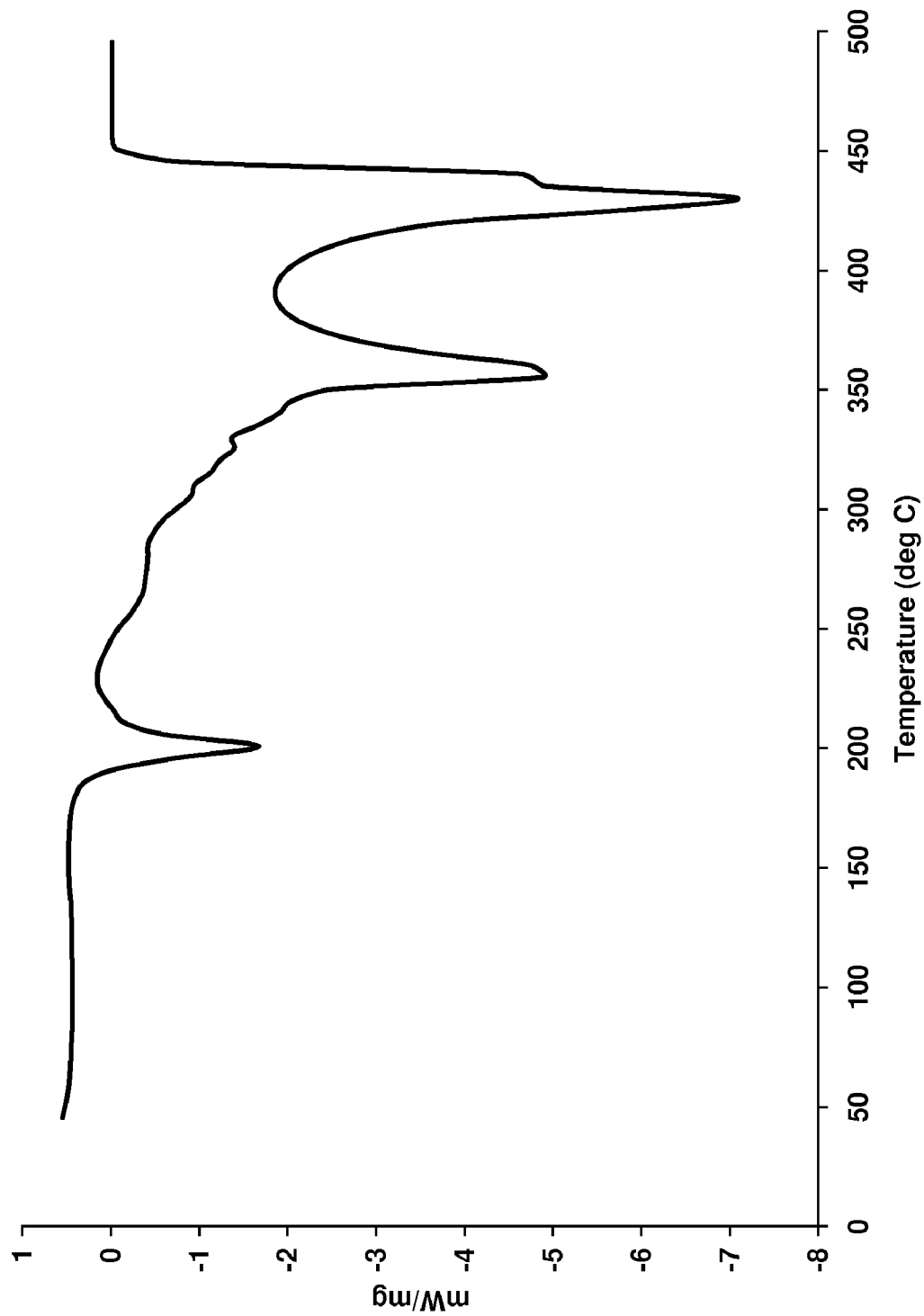
FIG. 1 is a differential scanning calorimetery (DSC) graph of an ethylcellulose polymer.

A conventional binder for phosphor coatings is ethylcellulose. A differential scanning calorimetry (DSC) scan (FIG. 1) shows that this polymer will decompose at standard baking temperatures in air. In particular, the DSC scan indicates an exothermic reaction going to completion at about 460° C.

Figure 2:
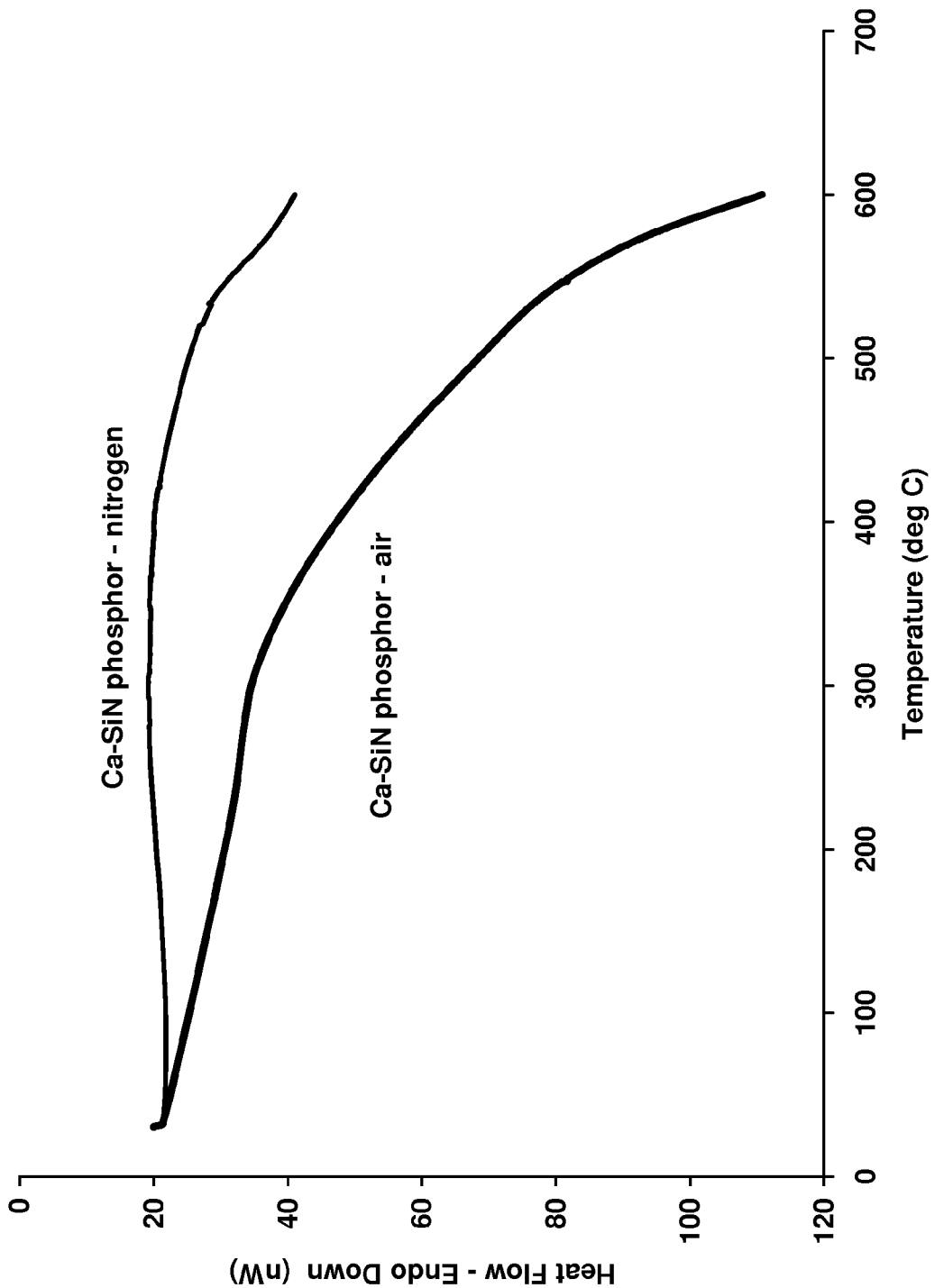
FIG. 2 shows DSC curves for an Ca—SiN phosphor in air and nitrogen showing the higher decomposition temperature of the Ca—SiN phosphor in nitrogen.
Figure 3:
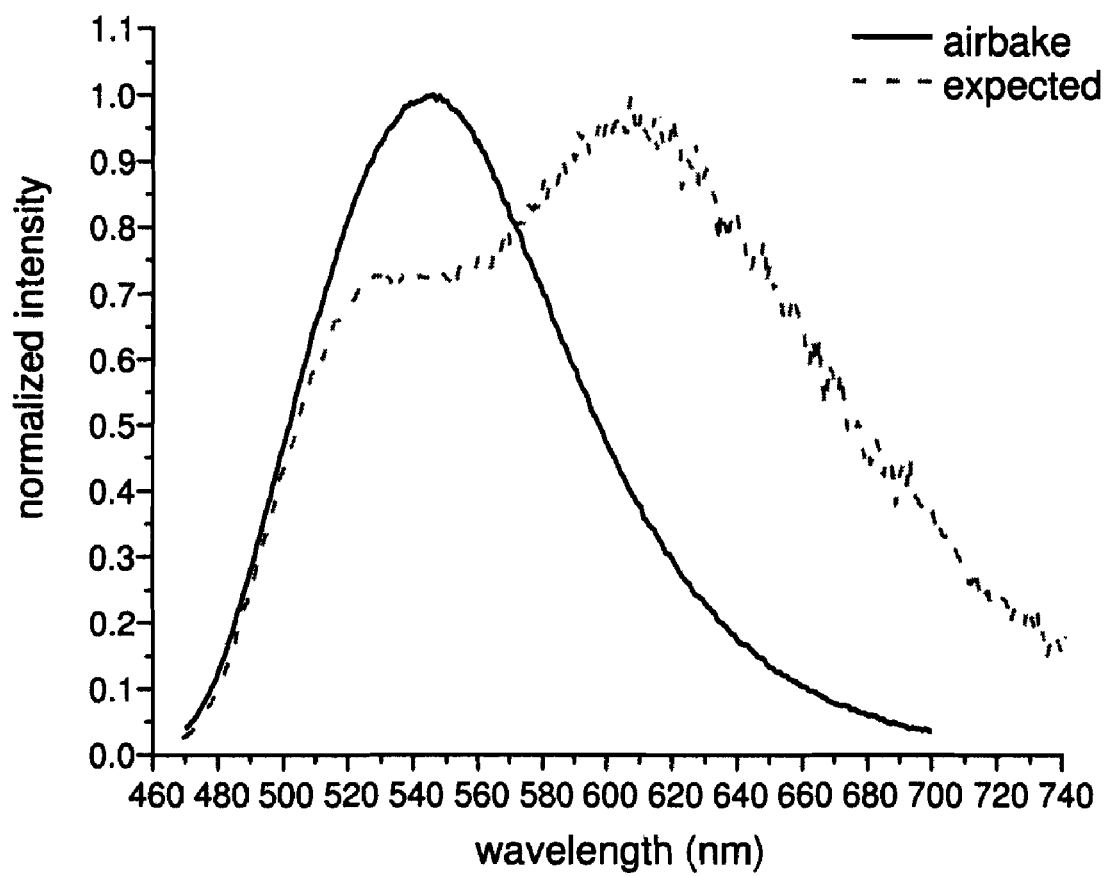
FIG. 3 shows normalized emission spectra of a blend of red- and green-emitting phosphors before and after the baking at 550° C. in air.

FIG. 2 is a DSC scan of a $Ca_2Si_5N_8:Eu$ phosphor (Ca—SiN) powder by itself. The curve indicates a reaction leading to degradation that begins at about 100° C. in air but not until 400° C. in nitrogen. FIG. 3 shows two emission spectra—one expected from the blend and the other actually measured—for a blend consisting of one red and two green phosphors, Ca$_2$Si$_5$N$_8$:Eu (Ca—SiN), Ca$_8$Mg(SiO$_4$)Cl$_2$:Eu (CAM-Si) and SrSi$_2$N$_2$O$_2$:Eu, respectively. This mixture should yield a relatively high CRI white light together with the blue emission from an InCl discharge. However, after baking in air, the emission is nearly devoid of red emission, indicating the sensitive nature of Ca—SiN red-emitting component to heating in air.

Figure 4:
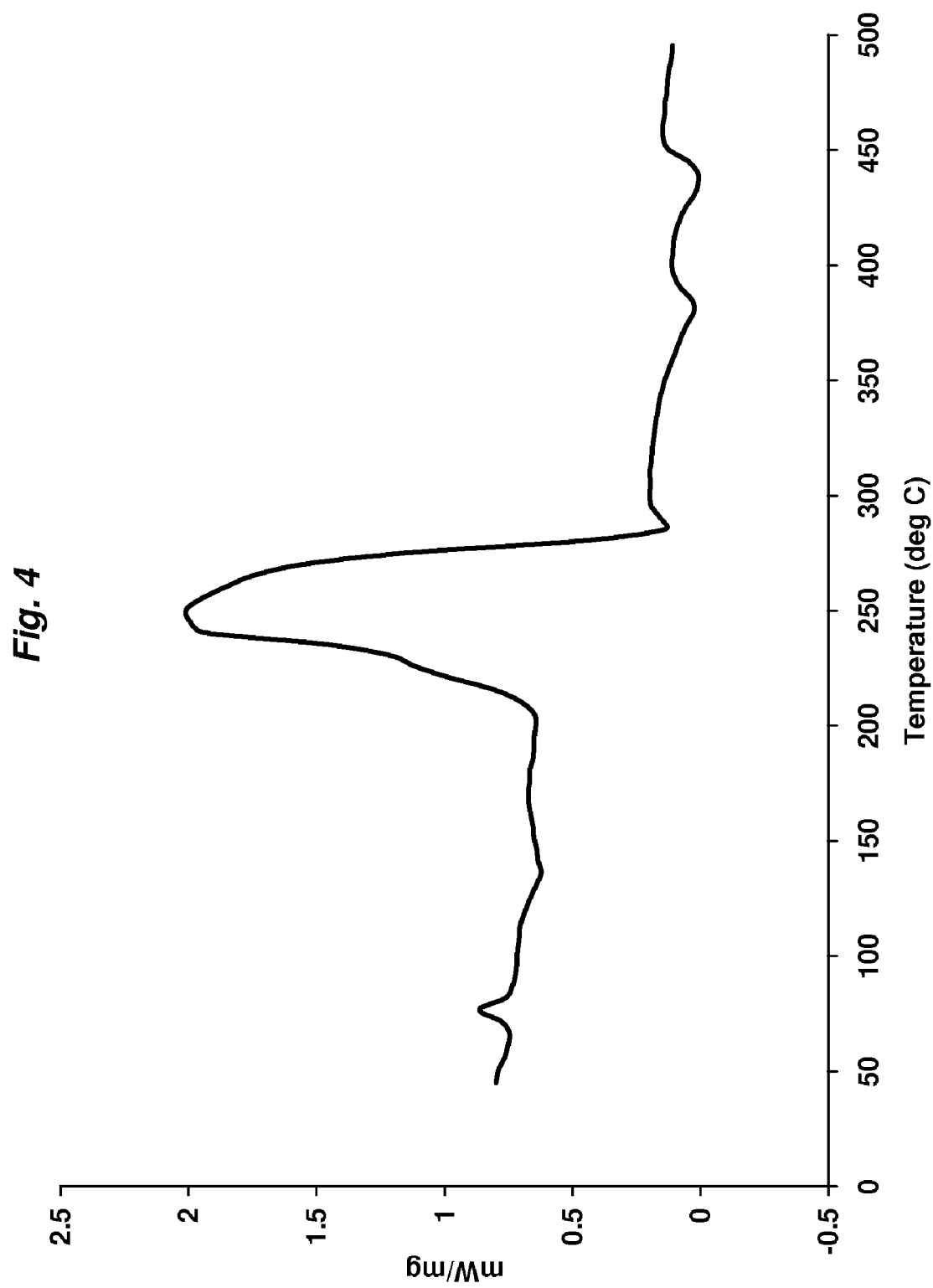
FIG. 4 is a DSC curve for a film of polyisobutyl-methacrylate (PIBMA).

In order to develop a usable suspension for coating lamps with nitridosilicate and oxonitridosilicate phosphors, a different polymer is required. In particular, the method of this invention uses a polymer which decomposes thermally via depolymerization instead of an oxidation reaction. A preferred polymer for this method is polyisobutyl-methacrylate (PIBMA). The depolymerization process for this polymer is endothermic and occurs in nitrogen as well as air. FIG. 4 is a DSC scan of a film of PIBMA. Another preferred polymer is polyethyl methacrylate.

Figure 5:
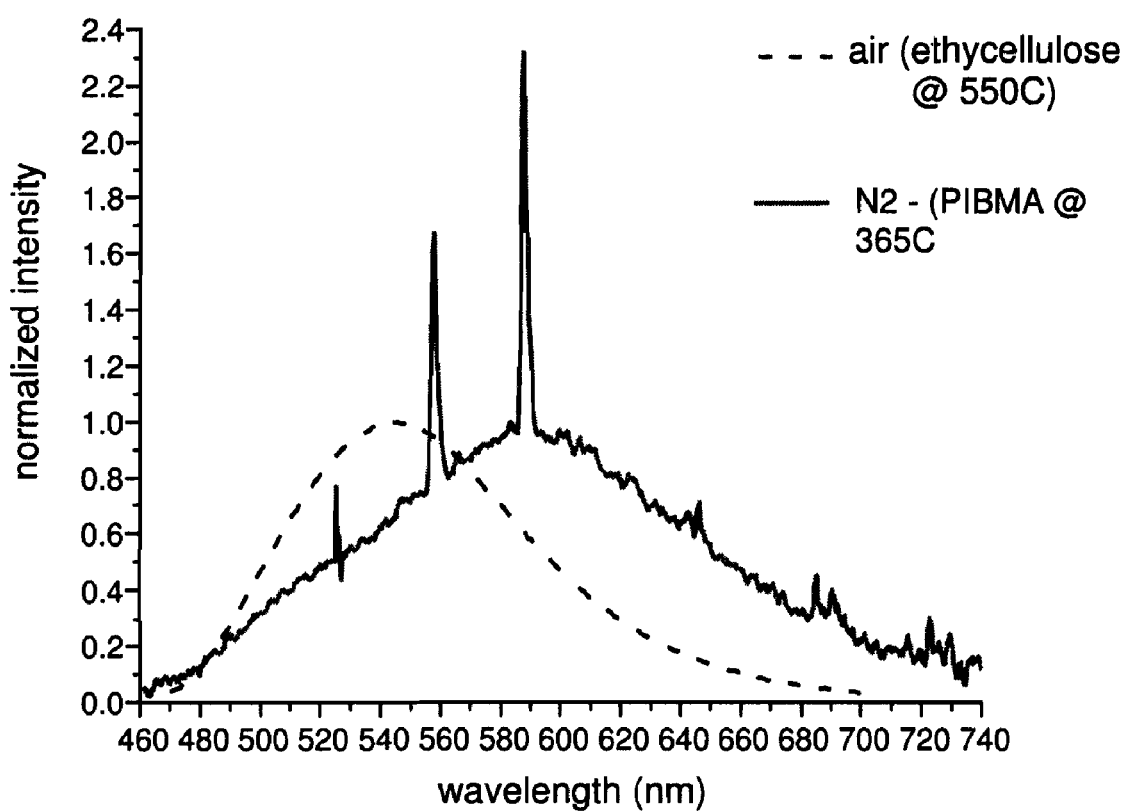
FIG. 5 is a comparison of the luminescence of a CAM-Si/Ca—SiN-based phosphor blend prepared by an ethylcellulose process (air baking at 550° C.) and prepared by the method of this invention.

A comparison of performance of the phosphor blend, as prepared with the ethylcellulose process (air baking at 550° C.) and the PIBMA process (nitrogen baking at 365° C.) can be seen in FIG. 5.

Preferably, the binder system comprises up to 20 weight percent (wt. %) of the polymer, 0-5 wt. % of a surfactant, preferably a long-chain amine, 0-5 wt. % of a suitable plasticizer, e.g., a high boiling point solvent, preferably dibutyl phthalate, and the balance being a suitable solvent that dissolves the polymer, e.g., xylene, toluene, or isopropyl alcohol.

A preferred method of coating the phosphor blends on a glass substrate uses a slurry of the blend and a polyisobutyl-methacrylate (PIBMA) binder (Elvacite 2045). A vehicle of 13 wt. % PIBMA and 87 wt. % xylene was prepared. Dibutylphthalate and a surfactant (Armeen CD) were added in equal amounts of 1.5 wt. %. A 43 gram amount of the vehicle was mixed with 0.7 grams of a high surface area aluminum oxide powder (Aluminum Oxide C) and rolled for 24 hours. Slurries of the phosphor blends were made by mixing about 4 grams of the phosphor blends with 4-6 ml of the vehicle. The slurry is applied to the glass surface, dried and the binder removed by baking in a nitrogen atmosphere at about 350° C.

While there have been shown and described what are presently considered to be the preferred embodiments of the invention, it will be apparent to those skilled in the art that various changes and modifications can be made herein without departing from the scope of the invention as defined by the appended claims.

We claim:

1. A method of applying a phosphor coating, comprising:
   (a) forming a suspension of a phosphor and a polymer binder system comprising a polymer binder dissolved in a solvent, the polymer binder being capable of decomposing thermally, the phosphor comprising at least one of:

$(S_{1-x-y-z}Ba_xCa_y)Si_2N_2O_2:Eu_z$, where $0<x<0.2$, $0<y<0.2$ and $0<z<0.1$;

$Ca_{1-x-y}Sr_xSi_2N_2O_2:Eu_y$, where $0<x<0.5$ and $0<y<0.1$;

$(Sr_{1-x-y-z}Ca_xBa_y)_2Si_5N_8:Eu_z$, where $0<x<1$, $0<y<1$ and $0<z<0.1$;

$(Sr_{1-x-y-z}Ba_xCa_y)_2Si_{5-a}Al_aN_{8-a}O_a:Eu_z$, where $0<x<1$, $0<y<1$, $0<z<0.1$ and $0<a<4$;

and $(Sr_{1-x-y-z}Ba_xCa_y)Si_2N_2O_2:Yb_z$, where $0<x<0.2$, $0<y<0.2$ and $0<z<0.1$;

(b) applying the suspension to a substrate to form a coating;
   (c) drying the coating; and
   (d) baking the coating in a nitrogen atmosphere at less than about 400° C. to thermally decompose the polymer binder to form the phosphor coating.

2. The method of claim 1 wherein the polymer binder system comprises up to 20 wt. % of the polymer binder, 0-5 wt. % of a surfactant, and 0-5 wt. % of a plasticizer.

3. The method of claim 2 wherein the solvent is at least one of xylene, toluene, and isopropyl alcohol.

4. The method of claim 3 wherein the polymer binder is polyisobutyl methacrylate.

5. The method of claim 2 wherein the plasticizer is dibutyl phthalate.

6. The method of claim 1 wherein the coating is baked at less than about 350° C.

7. The method of claim 1 wherein the coating is baked at a temperature between about 300° C. and 350° C.

8. The method of claim 1 wherein the polymer binder is polyethyl methacrylate.

9. The method of claim 1 wherein the polymer binder is polyisobutyl methacrylate.

* * * * *